Aug. 6, 1929.  C. H. ARNOLD  1,722,990
CASH REGISTER
Filed Dec. 17, 1924  2 Sheets-Sheet 1
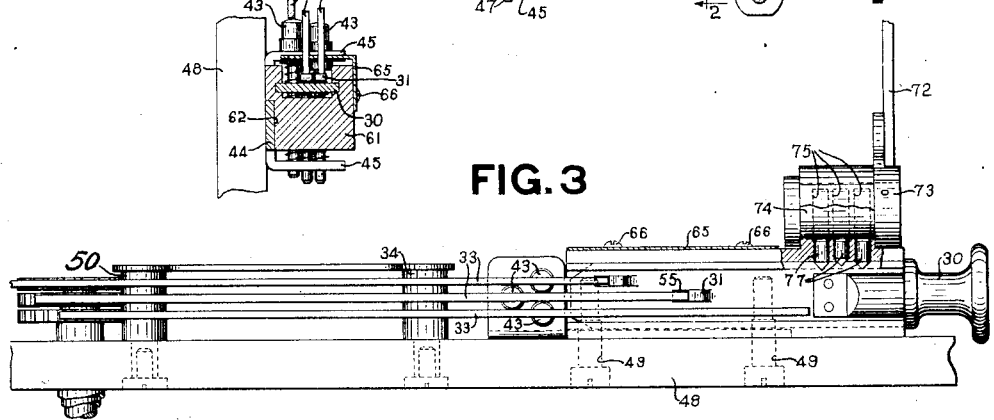

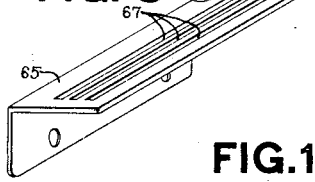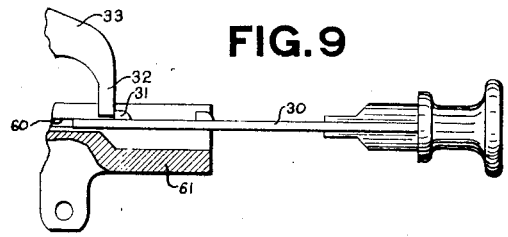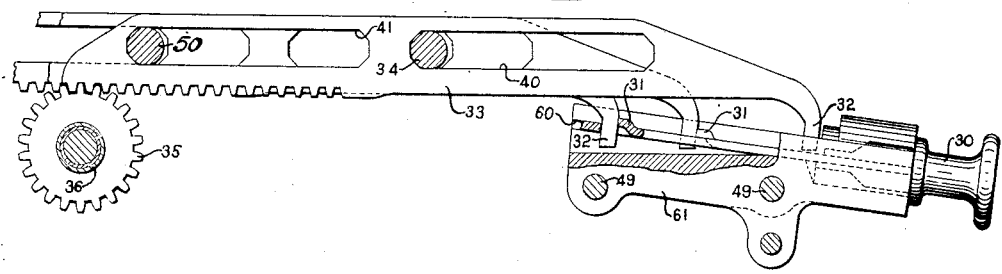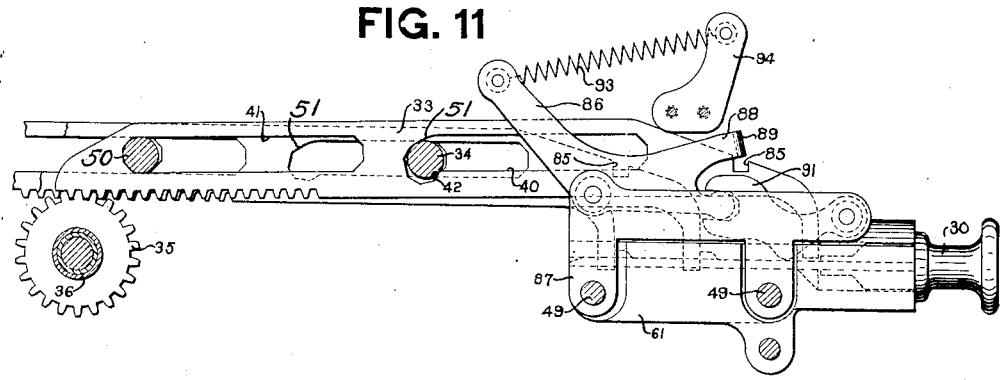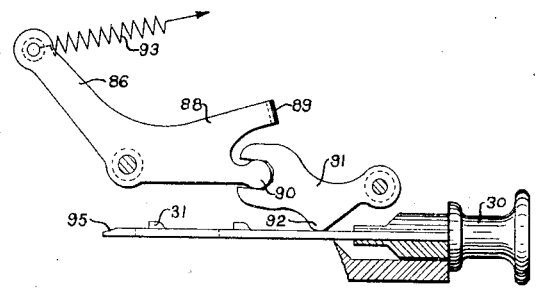

Patented Aug. 6, 1929.

1,722,990

UNITED STATES PATENT OFFICE.

CHARLES H. ARNOLD, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND.

CASH REGISTER.

Application filed December 17, 1924. Serial No. 756,533.

This invention relates to improvements in cash registers and particularly to insertable cashiers' keys and cooperating mechanism for selecting cashiers' type characters. The invention is shown adapted to a machine of the type shown in Letters Patent of the United States, No. 1,311,884, issued to Frederick L. Fuller, Aug. 5, 1919.

One object of this invention is to provide an insertable cashier's key which is positive in its action when inserted to position the type wheels, and when withdrawn to return the type wheels to their home positions.

Another object is to provide means to prevent accidental movement of the racks when there is no key in the machine.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said figures:

Fig. 1 is an elevation of the mechanism, with a key shown inserted in the machine.

Fig. 2 is a section taken on line 2—2 of Fig. 1, looking in the direction of the arrows.

Fig. 3 is a top plan view, partly in section, of the mechanism shown in Fig. 1.

Fig. 4 is a perspective view of a cashier's key, No. 95.

Fig. 5 is a perspective view of a cashier's key, No. 509.

Fig. 6 is a detail view, in elevation, of part of the mechanism for adjusting the type wheels.

Fig. 7 is a detail view showing means for permitting the machine to be released after a cashier's key has been inserted.

Fig. 8 is a detail perspective view of a means for guiding the type wheel adjusting racks.

Fig. 9 is a detail view, partly in section, showing the insertable key partly inserted and in position to adjust the type wheel racks.

Fig. 10 shows a modified form of the mechanism shown in Fig. 1, with the insertable key inserted in the machine.

Fig. 11 shows a modified form of mechanism for preventing accidental movement of the type wheel adjusting racks after the insertable key has been removed from the machine.

Fig. 12 is a detail view of a part of the mechanism shown in Fig. 11.

*General description.*

The function of insertable keys in machines of this type is to provide a check on the cashier or clerk who operates the machine. Each cashier is provided with an individual key which must be inserted in the machine before the machine can be released and operated. The insertion of the key not only permits the release of the machine, but also adjusts the type characters to a number corresponding to the number of the key. In this way it is impossible for any one to operate the machine without printing some identification mark. Each key has a number stamped thereon, as shown in Figs. 4 and 5, for the purpose of identifying the key. In the present embodiment 999 different keys can be used, which means that 999 individual cashiers may be identified.

Each key 30 has formed thereon a series of wards 31 (Figs. 1, 4, 5 and 9) which are adapted to engage downwardly projecting noses 32 of type wheel adjusting racks 33 to move the racks positively inwardly. There are three racks 33, slidably mounted on studs 34 and 50 (Figs. 1 and 3). Each rack engages a pinion 35 (Figs. 1 and 6), two of which are secured to the inner ends of sleeves 36. The other pinion 35 is secured to the inner end of the shaft which supports the sleeves 36. Gears 37 are secured to the outer ends of the shaft and sleeves, each of which meshes with an intermediate pinion 38 meshing with type wheels 39.

The noses 32 of the racks 33 are held in positions above the shank of the key 30, but in the paths of the wards 31, as the key is being inserted in the machine, as shown in Fig. 9. The racks are provided with slots 40 and 41 (Fig. 1) receiving the studs 34 and 50 respectively. The inner end of each slot 40 is defined by a cam edge cooperating with the stud 34 to raise the rack when the key is removed from the machine. The lower wall below the cam edge has a notch 42 to permit the right ends of the racks to be raised to lift the noses 32 up above the shank of key 30 as the racks 33 reach their home positions.

The racks 33 are also positively returned by the keys. As the racks are moved inwardly by the key, they are cammed down forcing the noses 32 into openings 55 cut in the keys in front of the wards 31. This camming action is produced by the above mentioned notch 42 as it rides under the stud 34 when the ward 31 engages the nose 32 and moves the rack. By referring to Fig. 9 it can be seen that when a key is inserted, the first ward 31 engages one of the noses 32 on the racks 33. Upon continued movement of the key this rack 33 is shifted to the left and another ward 31 contacts the nose 32 of another rack and shifts it to the left. This shifting of the racks 33 causes the right hand end of the racks 33 to rock downwardly and causes the main part of the slots 40 to surround the stud 34. These movements of the racks are transmitted to the type carriers in the manner above described.

As before mentioned there are three of the racks 33 shown in the present embodiment. However, all three of the racks are not moved by all of the keys. Any one, any two, or all three, may be moved, depending on the key being inserted. In Fig. 4 two wards 31 are shown. The right-hand ward (Fig. 4) is shown to represent the units digit of the cashier's number, and the left-hand one the tens. In Fig. 5 the left-hand ward 31 is also the units digit, the middle ward the hundreds digit, and the right-hand ward the tens digit. However, it is apparent that where only two wards are used the left-hand ward (Fig. 4) may be used as the tens and the middle as the units. When no ward 31 is in the path of a rack 33, said rack is left undisturbed when a key is inserted. The normal positions of the type carriers, with the racks in undisturbed positions are blank positions. Therefore if there is no projection on the key for a particular rack no digit will be printed for this rack. One step of movement is required to position "0", two steps for "1", three for "2", and so on up to "9", which requires ten steps of movement.

A keyway 60 (Figs. 9 and 10), cut into a lock 61, is provided to guide the key when inserted therein. The lock 61 is carried by the frame 48 (Figs. 2 and 3) and is secured thereto by the studs 49 (Figs. 1, 3, 8 and 11) which are also used to support a bracket 44 to be hereinafter described. The lock 61 has a recess 62 into which the bracket 44 fits. From this it can be seen that the studs 49 serve to hold both the bracket 44 and the lock 61 on the frame 48.

The racks 33 are guided by a slotted angle bar 65 (Figs. 1, 3 and 8), secured to the lock casing 61 by two screws 66. The bar 65 is provided with three slots 67, into which the noses 32 of the racks 33 extend. These slots form a guide and prevent lateral movement of the racks 33 so that they cannot become disengaged from the wards 31 of the keys 30 when they are being moved to position the type wheels.

When the key 30 is withdrawn from the machine the racks are returned to their normal positions without the aid of any spring, and in this way the action is made positive. From the above description it can be seen that the noses 32 are always in the openings 55 except when they are in their home positions. When the key is withdrawn, due to the fact that the noses 32 are positively engaged with the openings 55 in the keys, the racks are shifted to the right until the notch 42 of the slot 40 again engages the stud 34. At this time the springs 46 acting on the plungers 43 holds the racks in their elevated positions. This holding of the racks in the elevated positions prevents any accidental movement of the racks after the key has been withdrawn. The plungers 43 are mounted in flanges 45 of the before mentioned bracket 44. Each plunger has a reduced pilot 47. A spring surrounding the pilot 47 and bearing against the shoulder on the plunger and against the lower flange urges the plunger upwardly. From the above description it can be seen that when there is no key in the machine the noses 32 of the racks 33 are held in elevated positions, as shown in Fig. 9 and the notches 42 engage the stationary stud 34.

Machines of the type to which this embodiment is shown attached are provided with a release shaft 70 (Fig. 7). This shaft is given a counter-clockwise movement when the machine is being released. The mechanism for releasing the machine forms no part of the present invention and it is therefore thought unnecessary to disclose it in the present application. A detailed description may be had by referring to Letters Patent of the United States No. 1,311,884, issued to Frederick L. Fuller, above referred to. The counter-clockwise movement of the shaft 70 is prevented by mechanism which will now be described. Fast to the shaft 70 is an arm 71 which has pivoted thereto a link 72 pivoted at its lower end to an arm 73 fast to a lock cylinder 74 (Figs. 3 and 7). This cylinder 74 is of a construction similar to the cylinder in the well known tumbler locks. The barrel for the cylinder is formed in the lock casing 61. This lock is provided with three tumblers 75 (Fig. 3) which normally fit into openings in the cylinder. If there is no key in the machine the three tumblers 75 prevent rotation of the cylinder 74 and thereby prevent rocking of the shaft 70. When a key is inserted, the notches 76 in the key position three pins 77 which aline the tumblers 75 in a position which permits rotation of the cylinder 74 and thereby permits rocking of the shaft 70, which allows the release of the machine. From this it can be seen that it is impossible to release the machine without first inserting a key in the machine.

In the modified form shown in Fig. 10 the racks are moved in a horizontal plane, but the keyway 60 in the lock casing 61 is on an angle. This angle is such that when the key is inserted and the ward 31 engages the nose 32 it moves the rack in a horizontal line. The relative movement between the key 30, on an upwardly inclined angle, and, the horizontal movement of the racks 33 is such that it causes the openings 55 of the key to engage the noses 32 after the racks 33 start to move. From this it can be seen that the racks are positively positioned when the key is inserted. The movement of the racks back to their home positions when the key 30 is withdrawn is also positive, because the noses 32 do not become disengaged from the openings 55 until the racks reach their home positions.

A modified form of mechanism for preventing accidental movement of the racks 33 when there is no key in the machine is shown in Fig. 11. In this modification the racks are rocked upwardly in the home positions by the edges of the notches 42 of the slots 40 in the same manner as described in the preferred form. However, in this modification, no plungers 43 are provided to hold the racks in these positions. In said modified form each of the racks 33 has a notch 85 near its right hand end. An arm 86 pivoted on a bracket 87, mounted on the studs 49, has a horizontally projecting arm 88 on which is formed a flange 89 adapted to engage the notches 85 when there is no key in the machine. The arm 88 has a projection 90 (Fig. 12) formed thereon which enters a bifurcated arm 91 also pivoted on the above mentioned bracket 87. The arm 91 has a nose 92 (Fig. 12) which is adapted to be engaged by the key when it is inserted into the machine to disengage the flange 89 from the notches 85. When the key is withdrawn, a spring 93, stretched between a stud on bracket 94 secured to the frame 48 and a stud mounted on the arm 86, rocks the arm 91 in a clockwise direction, to move the flange 89 of the arm 88 into the notches 85 in the racks 33. At this time the notches 85 will have been alined by the key 30.

The key 30 is provided with a beveled end 95 which will engage the nose 92 when the key is inserted, and thereby cam the arm 91 clockwise which will disengage the flange 89 from the notches 85.

Operation.

Before the machine can be released for operation it is necessary to first insert a key into the machine, which permits release of the machine and at the same time positions the type characters so that upon operation of the machine, the number identifying the cashier whose key has been inserted will be printed on the record material.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. The combination of a differentially movable member, operating means for positioning said member differentially, and means for causing relative movement between said member and operating means to connect said member to said means to move the member to home position upon return movement of said means.

2. The combination of a differentially movable member, operating means for moving said member differentially from home position, means on said first mentioned means normally engageable with said member for moving the member from home position, and means operable upon movement of said member from home position, for moving said member and operating means relatively, to effect a connection between said member and operating means to cause said member to be moved to home position by the return movement of said operating means.

3. The combination of a key, a pair of differentially positioned shoulders on said key, and an adjustable slide, one of said shoulders being out of the plane of the other shoulder and adapted to adjust the said slide in one direction and the other shoulder adapted to adjust said slide in the other direction.

4. The combination of a differentially movable member, a cam on said member, and a member cooperating with said cam for moving said differentially movable member substantially at right angles to the direction in which it moves differentially.

5. The combination of a differentially movable member, a cam for moving said member in one direction, another cam for moving said member in the other direction, said movements being substantially at right angles to the direction in which it moves differentially, and means cooperating with said cams to effect said movements.

6. The combination of a differentially movable member, a fixedly mounted aliner, and means on the member cooperable with the aliner for moving said member into cooperative alining relation with said aliner.

7. The combination of a movable member having a substantially straight slot with a depression in one end, means cooperating with said slot to guide said member in a straight line and to rock it on a pivot when in a certain position, and means for holding it in the rocked position to prevent accidental movement thereof.

8. The combination of an insertable key having an opening therein, a ward on said key, a type carrier, a rack operatively connected with said type carrier, a nose on said rack adapted to be engaged by the ward on said key and adapted to enter the opening in said key, and means for causing said nose to disengage from said opening when the rack is moved to home position by said key.

9. The combination of a slide, a key having means for shifting said slide in one direction, means for shifting said slide in another direction said second mentioned means positioned in a different plane from that of the said first mentioned means, and means for disengaging the slide from the said second means when the slide is moved into home position.

10. The combination of a type carrier, a removable key, a slidable member operatively connected to said type carrier and adapted to be connected to said key, and means for causing said slidable member to disengage from said key when said slidable member is moved into home position.

In testimony whereof I affix my signature.

CHARLES H. ARNOLD.